(12) United States Patent
Agahian et al.

(10) Patent No.: US 10,019,926 B2
(45) Date of Patent: Jul. 10, 2018

(54) ADAPTIVE CALIBRATION AND ADAPTIVE TRANSFORMATION MATRICES FOR AMBIENT LIGHT SENSORS

(71) Applicant: Apple Inc., Cupertino, CA (US)

(72) Inventors: Farnaz Agahian, Cupertino, CA (US);
Jiaying Wu, San Jose, CA (US);
Zhang Jia, Santa Clara, CA (US);
Cheng Chen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 72 days.

(21) Appl. No.: 14/862,026

(22) Filed: Sep. 22, 2015

(65) Prior Publication Data

US 2016/0370231 A1 Dec. 22, 2016

Related U.S. Application Data

(60) Provisional application No. 62/182,083, filed on Jun. 19, 2015.

(51) Int. Cl.
*G09G 3/20* (2006.01)
*G01J 3/46* (2006.01)
(Continued)

(52) U.S. Cl.
CPC .............. *G09G 3/2003* (2013.01); *G01J 3/463* (2013.01); *G01J 3/50* (2013.01); *G01J 1/4204* (2013.01);
(Continued)

(58) Field of Classification Search
CPC ........ G01J 3/50; G01J 3/463; G01J 2003/467;
G01J 1/42; G01J 1/4204; G09G 3/2003;
G09G 2360/144; G09G 2320/0233; G09G
2320/0242; G09G 2320/0666; G09G
2320/0673; G09G 2320/04; G09G
2320/041; G09G 2320/0693; G09G
3/3413; G09G 2340/06; G09G 2360/14;
(Continued)

(56) References Cited

U.S. PATENT DOCUMENTS

| | | | |
|---|---|---|---|
| 7,015,955 B2 * | 3/2006 | Funston | H04N 1/46 348/223.1 |
| 7,102,648 B1 * | 9/2006 | Holub | G06F 3/14 345/589 |

(Continued)

*Primary Examiner* — Darlene M Ritchie
(74) *Attorney, Agent, or Firm* — Treyz Law Group, P.C.; Kendall W. Abbasi

(57) ABSTRACT

An electronic device may be provided with a display mounted in a housing. A color sensing ambient light sensor may measure the color of ambient light. The color sensing ambient light sensor may produce sensor output signals in a device-dependent color space. Control circuitry in the electronic device may convert the sensor output signals from the device-dependent color space to a device-independent color space using a color converting matrix. The color converting matrix may be determined using stored training data. The training data may include color data for different training light sources. The training data may be weighted to selectively control the influence of the training data on the color converting matrix. The training data may be weighted based on a distance between the training color data and a target color in the detected ambient light.

16 Claims, 10 Drawing Sheets

(51) Int. Cl.
*G01J 3/50* (2006.01)
*G01J 1/42* (2006.01)

(52) U.S. Cl.
CPC ... *G01J 2003/467* (2013.01); *G09G 2320/0233* (2013.01); *G09G 2320/0242* (2013.01); *G09G 2320/0693* (2013.01); *G09G 2340/06* (2013.01); *G09G 2360/144* (2013.01)

(58) Field of Classification Search
CPC ....... G09G 2360/141; G09G 2360/142; G09G 2360/145; H04N 19/18; H04N 19/186; H04N 9/77; H04N 9/67
See application file for complete search history.

(56) References Cited

U.S. PATENT DOCUMENTS

| | | | | |
|---|---|---|---|---|
| 7,136,076 B2* | 11/2006 | Evanicky | | G01J 3/02 345/600 |
| 7,184,067 B2* | 2/2007 | Miller | | G09G 3/3208 315/169.3 |
| 8,405,674 B2* | 3/2013 | Sakai | | G01J 1/4204 345/589 |
| 8,508,553 B2* | 8/2013 | Dodge | | G09G 5/00 345/102 |
| 8,536,511 B2* | 9/2013 | Tam | | G01J 1/1626 250/214.1 |
| 8,559,710 B2 | 10/2013 | Sasaki | | |
| 8,730,218 B2 | 5/2014 | Wilson | | |
| 8,860,653 B2 | 10/2014 | Mahowald et al. | | |
| 9,875,724 B2* | 1/2018 | Gao | | G09G 5/02 |
| 9,947,275 B1* | 4/2018 | Ramanath | | G09G 3/3413 |
| 2001/0035853 A1* | 11/2001 | Hoelen | | G02F 1/133603 345/102 |
| 2003/0020725 A1* | 1/2003 | Matsuda | | G09G 5/00 345/600 |
| 2003/0025711 A1* | 2/2003 | Kuo | | G09G 5/02 345/600 |
| 2005/0030271 A1* | 2/2005 | Liu | | G09G 3/3611 345/89 |
| 2006/0038807 A1* | 2/2006 | Eckhardt | | H04N 1/407 345/207 |
| 2007/0176870 A1* | 8/2007 | Hung | | G09G 3/3413 345/88 |
| 2008/0221734 A1 | 9/2008 | Nagao et al. | | |
| 2008/0291139 A1* | 11/2008 | Hsieh | | G09G 3/20 345/77 |
| 2008/0303918 A1* | 12/2008 | Keithley | | G09G 3/20 348/223.1 |
| 2009/0051711 A1* | 2/2009 | Evanicky | | G09G 3/006 345/690 |
| 2009/0302781 A1* | 12/2009 | Peker | | G09G 3/3413 315/297 |
| 2010/0301755 A1* | 12/2010 | Pance | | H05B 33/0869 315/149 |
| 2012/0001841 A1* | 1/2012 | Gokingco | | G01J 1/32 345/102 |
| 2012/0019494 A1* | 1/2012 | Lum | | G09G 5/10 345/207 |
| 2012/0086344 A1* | 4/2012 | Schuch | | G02F 1/133603 315/152 |
| 2013/0076712 A1* | 3/2013 | Zheng | | G01J 1/32 345/207 |
| 2013/0120431 A1* | 5/2013 | Kawaguchi | | G06T 5/00 345/590 |
| 2014/0072189 A1 | 3/2014 | Jena et al. | | |
| 2014/0132578 A1* | 5/2014 | Zheng | | G09G 5/10 345/207 |
| 2014/0140616 A1* | 5/2014 | Choi | | H04N 1/6058 382/167 |
| 2015/0070337 A1* | 3/2015 | Bell | | G09G 3/2003 345/207 |
| 2016/0133199 A1* | 5/2016 | Chu | | G09G 3/3413 345/690 |
| 2016/0202843 A1* | 7/2016 | Suggs | | G09G 3/002 345/175 |

\* cited by examiner $$\begin{bmatrix} X \\ Y \\ Z \end{bmatrix} = T \begin{bmatrix} PD1 \\ PD2 \\ PD3 \\ PD4 \\ PD5 \\ PD6 \end{bmatrix}$$

*FIG. 5*

ADAPTIVE CALIBRATION AND ADAPTIVE TRANSFORMATION MATRICES FOR AMBIENT LIGHT SENSORS

This application claims the benefit of provisional patent application No. 62/182,083 filed on Jun. 19, 2015, which is hereby incorporated by reference herein in its entirety.

BACKGROUND

This relates generally to electronic devices, and, more particularly, to light sensors for electronic devices.

Electronic devices such as laptop computers, cellular telephones, and other equipment are sometimes provided with light sensors. For example, ambient light sensors may be incorporated into a device to provide the device with information on current lighting conditions. Ambient light readings may be used in controlling the device. If, for example bright daylight conditions are detected, an electronic device may increase display brightness to compensate.

Ambient light conditions sometimes include significant changes in color. For example, an electronic device may be used in a cool color temperature environment such as outdoors shade or a warm color temperature environment such as an indoors environment that has been lit with incandescent lighting. Content that appears to be correctly displayed on a display in one of these environments may have an unpleasant color cast in the other environment. For example, a display that is properly adjusted in an outdoors environment may appear overly cool under incandescent lighting.

It would therefore be desirable to be able to improve the presentation of color images or to take other suitable actions based on ambient lighting attributes such as ambient light color information.

SUMMARY

An electronic device may be provided with a display mounted in a housing. A color sensing ambient light sensor may measure the color of ambient light. The color sensing ambient light sensor may be mounted in alignment with an ambient light sensor window formed in an inactive area of the display or elsewhere within the housing.

The color sensing ambient light sensor may be formed from an array of light detectors on a semiconductor substrate. Some of the detectors may have spectral sensitivity profiles that fully or partly match those of color matching functions. The color sensing ambient light sensor may also include an infrared light detector.

The color sensing ambient light sensor may produce sensor output signals in a device-dependent color space. Control circuitry in the electronic device may convert the sensor output signals from the device-dependent color space to a device-independent color space using a color converting matrix. The color converting matrix may be determined using stored training data. The training data may include color data for different training light sources. The control circuitry may weight the training data to selectively control the influence of the training data on the color converting matrix. The training data may be weighted based on a distance between the training color data and a target color in the detected ambient light.

BRIEF DESCRIPTION OF THE DRAWINGS

FIG. 5 is a matrix equation that may be used to convert a sensor output signal from a device-dependent color space to a device-independent color space in accordance with an embodiment.

DETAILED DESCRIPTION

Figure 1:
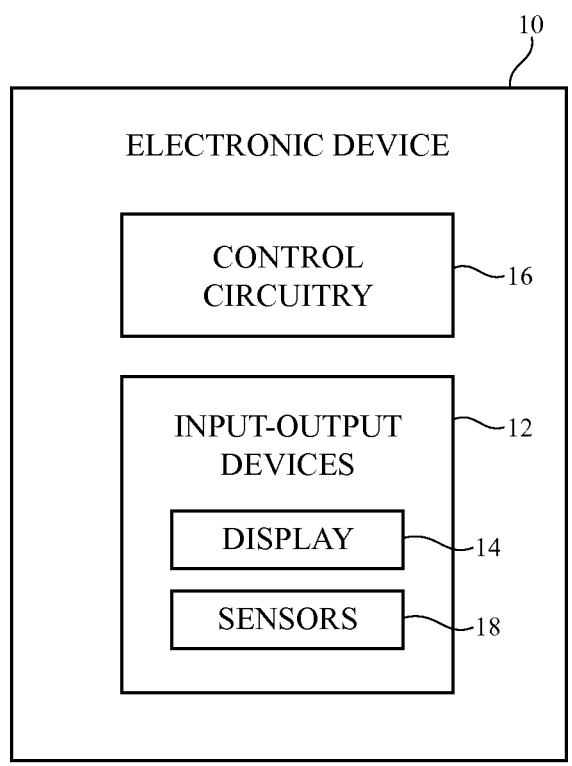
FIG. 1 is a schematic diagram of an illustrative electronic device having an ambient light sensor in accordance with an embodiment.

An illustrative electronic device of the type that may be provided with one or more light sensors is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Input-output devices 12 may also include sensors 18. Sensors 18 may include an ambient light sensor and other sensors (e.g., a capacitive proximity sensor, a light-based proximity sensor, a magnetic sensor, an accelerometer, a force sensor, a touch sensor, a temperature sensor, a pressure sensor, a compass, a microphone or other sound sensor, or other sensors).

An ambient light sensor for device 10 may have an array of detectors each of which is provided with a different respective color filter. Information from the detectors may be used to measure the total amount of ambient light that is present in the vicinity of device 10. For example, the ambient light sensor may be used to determine whether device 10 is in a dark or bright environment. Based on this information, control circuitry 16 can adjust display brightness for display 14 or can take other suitable action.

The array of colored detectors may also be used to make color measurements (i.e., the ambient light sensor may be a color sensing ambient light sensor). Color measurements may be gathered as color coordinates, color temperature, or correlated color temperature. Processing circuitry may be used to convert these different types of color information to other formats, if desired (e.g., a set of color coordinates may be processed to produce an associated correlated color temperature, etc.). Configurations in which the color information gathered by the ambient light sensor is a set of color coordinates are sometimes described herein as an example. This is, however, merely illustrative. The color sensing ambient light sensor may gather any suitable color information on ambient light. Total brightness (ambient light intensity) may also be measured.

Color information from the color sensing ambient light sensor (and/or brightness information) can be used to adjust the operation of device 10. For example, the color cast of display 14 may be adjusted in accordance with the color of ambient lighting conditions. If, for example, a user moves device 10 from a cool lighting environment to a warm lighting environment (e.g., an incandescent light environment), the warmth of display 14 may be increased accordingly, so that the user of device 10 does not perceive display 14 as being overly cold. If desired, the ambient light sensor may include an infrared light sensor. In general, any suitable actions may be taken based on color measurements and/or total light intensity measurements (e.g., adjusting display brightness, adjusting display content, changing audio and/or video settings, adjusting sensor measurements from other sensors, adjusting which on-screen options are presented to a user of device 10, adjusting wireless circuitry settings, etc.).

Figure 2:
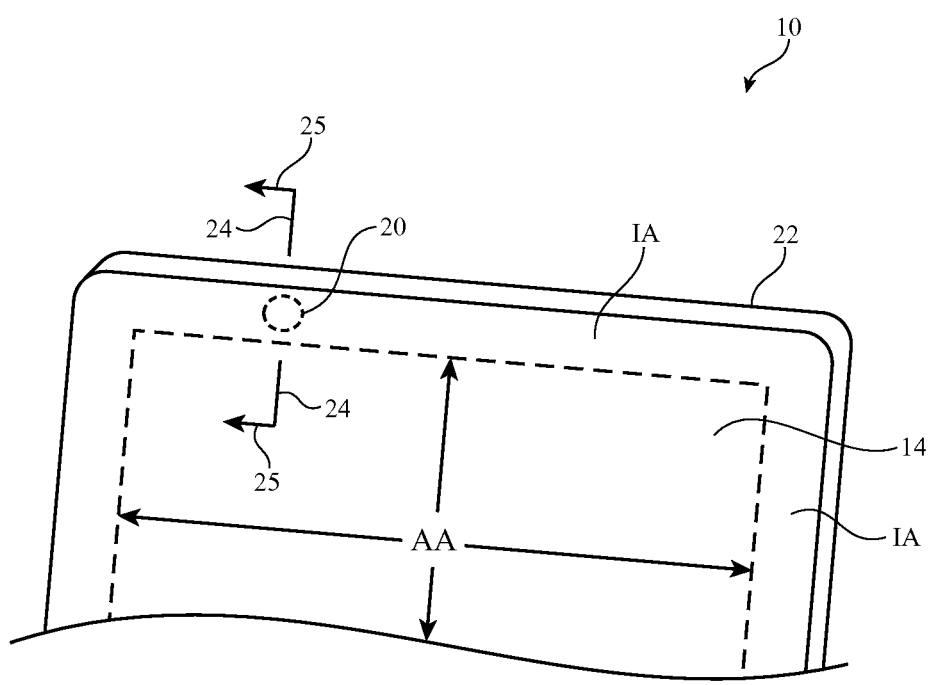
FIG. 2 is a perspective view of a portion of an electronic device display within which an ambient light sensor has been mounted in accordance with an embodiment.

A perspective view of a portion of an illustrative electronic device is shown in FIG. 2. In the example of FIG. 2, device 10 includes a display such as display 14 mounted in housing 22. Housing 22, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 22 may be formed using a unibody configuration in which some or all of housing 22 is machined or molded as a single structure or may be formed using multiple structures (e.g., an internal frame structure, one or more structures that form exterior housing surfaces, etc.).

Display 14 may be protected using a display cover layer such as a layer of transparent glass, clear plastic, sapphire, or other clear layer. Openings may be formed in the display cover layer. For example, an opening may be formed in the display cover layer to accommodate a button, a speaker port, or other components. Openings may be formed in housing 22 to form communications ports (e.g., an audio jack port, a digital data port, etc.), to form openings for buttons, etc.

Display 14 may include an array of display pixels formed from liquid crystal display (LCD) components, an array of electrophoretic pixels, an array of plasma pixels, an array of organic light-emitting diode pixels or other light-emitting diodes, an array of electrowetting pixels, or pixels based on other display technologies. The array of pixels of display 14 forms an active area AA. Active area AA is used to display images for a user of device 10. Active area AA may be rectangular or may have other suitable shapes. Inactive border area IA may run along one or more edges of active area AA. Inactive border area IA may contain circuits, signal lines, and other structures that do not emit light for forming images. To hide inactive circuitry and other components in border area IA from view by a user of device 10, the underside of the outermost layer of display 14 (e.g., the display cover layer or other display layer) may be coated with an opaque masking material such as a layer of black ink. Optical components (e.g., a camera, a light-based proximity sensor, an ambient light sensor, status indicator light-emitting diodes, camera flash light-emitting diodes, etc.) may be mounted under inactive border area IA. One or more openings (sometimes referred to as windows) may be formed in the opaque masking layer of IA to accommodate the optical components. For example, a light component window such as an ambient light sensor window may be formed in a peripheral portion of display 14 such as region 20 in inactive border area IA. Ambient light from the exterior of device 10 may be measured by an ambient light sensor in device 10 after passing through region 20 and the display cover layer.

Figure 3:
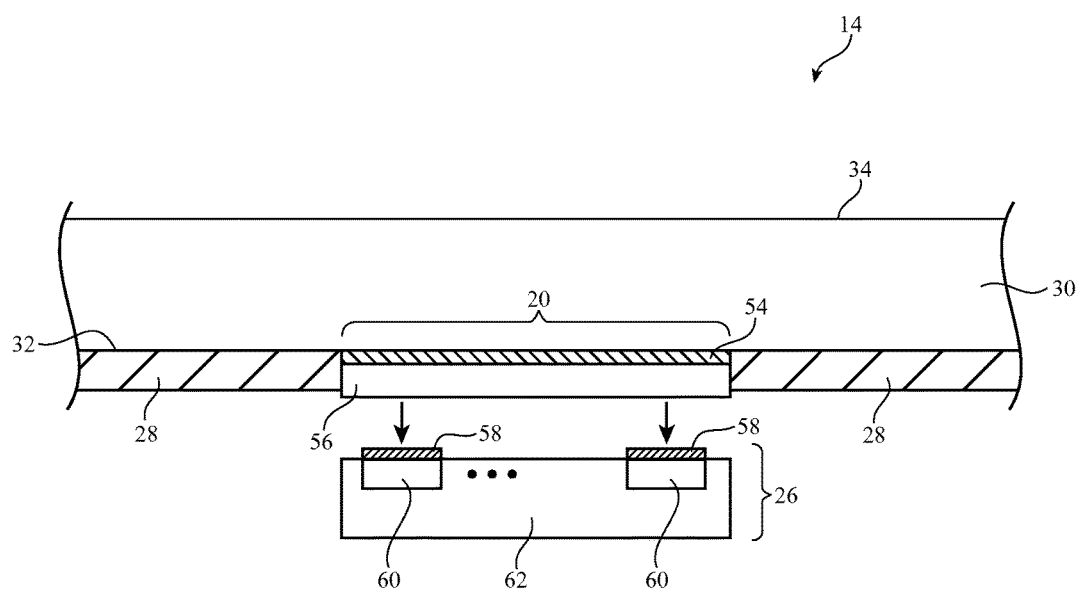
FIG. 3 is a cross-sectional side view of an illustrative light sensor that is being exposed to ambient light in accordance with an embodiment.

FIG. 3 is a cross-sectional side view of display 14 of FIG. 2 taken along line 24 and viewed in direction 25 of FIG. 2. As shown in FIG. 3, light sensor 26 may be mounted in alignment with window 20. Window 20 may have a circular shape, a square shape, a shape with curved and/or straight edges, a circular ring shape with a central opaque region, or any other suitable shape. Light sensor 26 may be a color sensing ambient light sensor that is used in measuring ambient light in the vicinity of device 10. As shown in FIG. 3, display 14 may have an outermost layer such as display cover layer 30. Display cover layer 30 has an outer surface such as surface 34. Rays of ambient light are characterized by various angles of incidence A.

Window 20 may be formed from an opening in opaque masking layer 28 on inner surface 32 of display cover layer 30 in inactive area IA. Layer 30 may be formed from glass, plastic, ceramic, sapphire, or other transparent materials and may be a part of a display module for display 14 or may be a separate protective layer that covers active display structures. The opening associated with window 20 may be filled with optical structures such as ambient light sensor ink 54 and light redirecting structures 56.

Ambient light sensor ink 54 may have sufficient transparency at visible and infrared wavelengths to allow sensor 26 to operate, while at the same time enhancing the outward appearance of window 20 (e.g., by partly obscuring the presence of window 20 to a user of device 10 by making window 20 have a visual appearance that is not too dissimilar from the portion of layer 30 that includes layer 28). If desired, ambient light sensor ink 54 may be omitted.

Sensor 26 may have multiple light detectors 60 (e.g., photodiodes, phototransistors, or other semiconductor photodetector structures). Light detectors 60 may be formed in an array on a common semiconductor substrate such as substrate 62 or may be formed using two or more substrates. Each of light detectors 60 may be provided with a corresponding color filter 58. To provide sensor 26 with the ability to accurately measure colors, sensor 26 may include two or more detectors 60 (e.g., 2-10 detectors, 3-8 detectors, 4-7 detectors, 5-7 detectors, only 4 detectors or more than 4 detectors, only 5 detectors or more than 5 detectors, only 6 detectors or more than 6 detectors, only 7 detectors or more than 7 detectors, only 8 detectors or more than 8 detectors, fewer than 8 detectors, or any other suitable number of detectors). Filters 58 may be thin-film interference filters and/or may be colored layers of polymer or other color filter elements (e.g., colored filters formed from dyes and/or pigments).

Light redirecting structures 56 may be used to gather light from a variety of angles of incidence and to effectively pass this light to sensor 26. Light redirecting structures 56 may include structures such as diffusers and/or patterned lenses to help redirect off-axis ambient light rays into sensor 26 at an angle that is close to perpendicular to the surface of substrate 62, thereby reducing the dependence of ambient light readings on the relative orientation between device 10 and the sources of ambient light.

Figure 4:
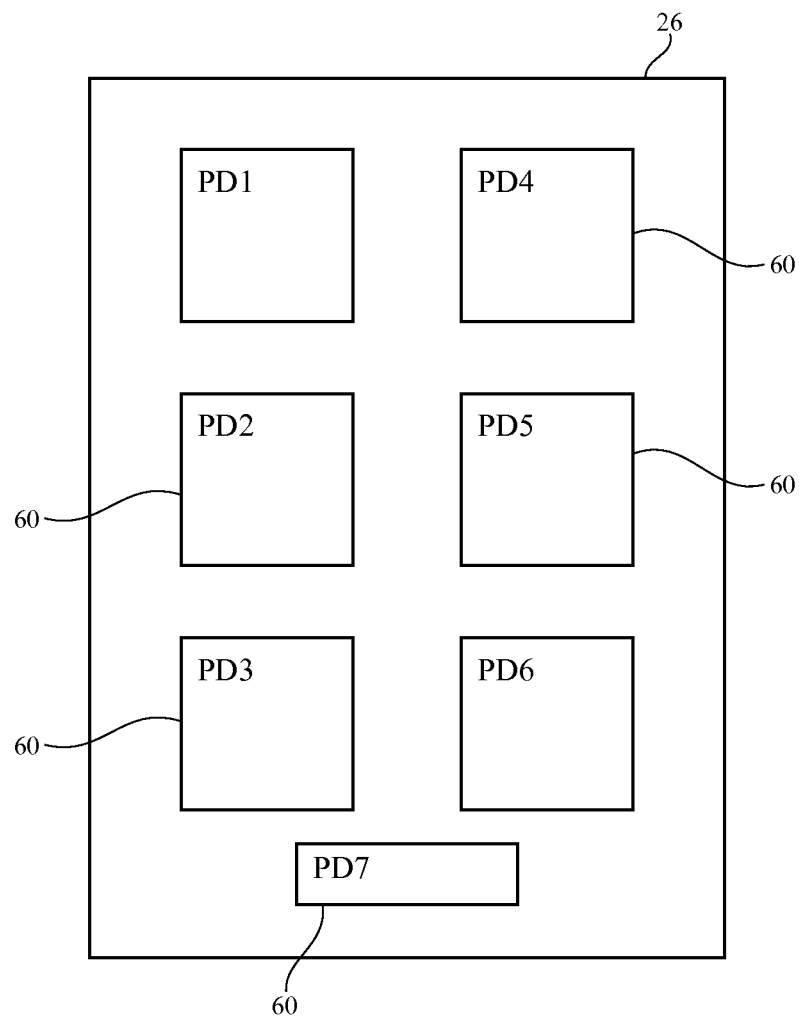
FIG. 4 is a top view of an illustrative multichannel ambient light sensor in accordance with an embodiment.

To allow sensor 26 to make color measurements, sensor 26 may have an array of light detectors 60, each of which may have a different spectral profile for gathering light. In the example of FIG. 4, there are six visible light detectors 60 (PD1, PD2, PD3, PD4, PD5, and PD6) and one infrared light detector PD7. This is merely illustrative. For example, there may be fewer than six (e.g., five, four, or three or fewer.) or more than six (e.g., seven, eight, or more than eight) visible light detectors. Infrared light detector PD7 may be omitted or infrared light detection capabilities may be provided by extending the long wavelength sensitivity of a red detector so that the red detector has a spectral sensitivity profile that overlaps near infrared wavelengths. As an example, PD7 may be omitted and PD6 may be a red light detector with an extended spectral profile that is sensitive at infrared wavelengths. In this type of configuration, the IR response of PD6 may be used to help discriminate between different types of light sources (e.g., IR or non-IR, etc.) and may provide a visible spectral profile contribution (e.g., red sensitivity) to sensor 26 that helps sensor 26 measure the color of ambient light.

In one illustrative arrangement, PD1 may have a blue spectral response, detector PD6 may have a red spectral response, and the spectral responses of detectors PD2, PD3, PD4, and PD5 may cover respective wavelength ranges between the blue and red ends of the visible spectrum. Detector PD7 may cover infrared wavelengths (e.g., wavelengths including wavelengths above 700 nm, between 800-900 nm, etc.). This is, however, merely illustrative. If desired, detectors 60 may have other spectral responses.

To enhance color sensing accuracy, it may be desirable to configure the spectral responses of detectors 60 so that one or more of detectors 60 has a spectral response that matches a color matching function (e.g., one of the three CIE standard observer color matching functions $\bar{x}$, $\bar{y}$, and $\bar{z}$). The color matching functions represent the spectral response of a standard observer. For example, the spectral response of detector PD1 may partially or fully match the spectral shape of color matching function $\bar{z}$, the spectral response of detector PD3 may partially or fully match the spectral shape of color matching function $\bar{y}$, and the spectral response of detector PD4 may partially or fully match the spectral shape of color matching function $\bar{x}$.

In addition to the spectral responses of detectors 60 that match the color matching functions, detectors 60 may cover other spectral ranges (e.g., ranges that partly overlap other the coverage ranges of other detectors and that help provide coverage over the entire visible spectrum), thereby enhancing color measurement accuracy. At the same time, the use of an excessive number of different detectors may be avoided to avoid excessive cost, complexity, and power consumption. Readings from infrared detector PD7 may be used to enhance accuracy for visible light detection (e.g., by removing infrared contributions to the visible light detectors) and/or may be used to help allow sensor 26 to discriminate between different types of lighting source. As an example, light sources with little or no infrared (IR) light may be characterized as non-IR sources, whereas light sources that contain significant light detected by detector PD7 may be characterized as IR sources.

The output of light sensor 26 may be dependent on the spectral sensitivities of detectors 60 in light sensor 26. Because spectral sensitivity can vary from sensor to sensor, the output signals from sensor 26 may be device-dependent (e.g., the output signals may be values in a device-dependent color space). Thus, to accurately measure the color and brightness of ambient light, control circuitry 16 may convert the device-dependent output signals of light sensor 26 to a device-independent color space. FIG. 5 shows a matrix equation in which color converting matrix T is used to convert device-dependent sensor output values PD1 . . . PD6 to a device-independent color space (e.g., CIE XYZ). In the example of FIG. 5, sensor 26 has six visible light sensors, so the sensor output matrix includes one column of six detector outputs PD1 . . . PD6. Detector outputs PD1 . . . PD6 may be obtained when sensor 26 is exposed to ambient light (e.g., when device 10 is being used by a user). Detector outputs may be values associated with a sensor-dependent color space. For example, detector outputs may be red, green, and blue (RGB) values in a red-green-blue color space, may be red, green, blue, and clear/white values in a red-green-blue-clear or red-green-blue-white color space, or may be values in another suitable device-dependent color space. When color converting matrix T is applied to sensor output values PD1 . . . PD6, the ambient light data may be converted to a device-independent color space and may be represented by tristimulus values X, Y, and Z. The example of FIG. 5 in which sensor output data is converted to the CIE XYZ color space is merely illustrative. If desired, sensor output data may be converted to any other suitable device-independent color space.

In conventional electronic devices, a fixed color converting matrix is used to map light sensor RGB values to CIE XYZ tristimulus values. However, the same color converting matrix may not be appropriate for all ambient lighting conditions. For example, one color converting matrix may accurately map colors to a device-independent color space in a first ambient lighting condition, but may inaccurately map colors to a device-independent color space in a second ambient lighting condition, leading to inaccurate measurements of the color and brightness of ambient light.

To accurately convert sensor output data to a device-independent color space, matrix T of FIG. 5 may be adaptive. For example, in addition to or rather than storing a fixed color converting matrix in device 10 to be used for all ambient lighting conditions, matrix T may be adaptively determined during operation of device 10 based on ambient lighting conditions.

To enable on-the-fly computing of color converting matrix T, device 10 may store training data that contains information about different types of representative light sources (sometimes referred to as training light sources). The training data may be gathered during calibration operations and may indicate a relationship between the device-dependent spectral response of sensor 26 and the device-independent color information associated with the different light sources. This information may be stored in electronic device 10 (e.g., using control circuitry 16).

Figure 6:
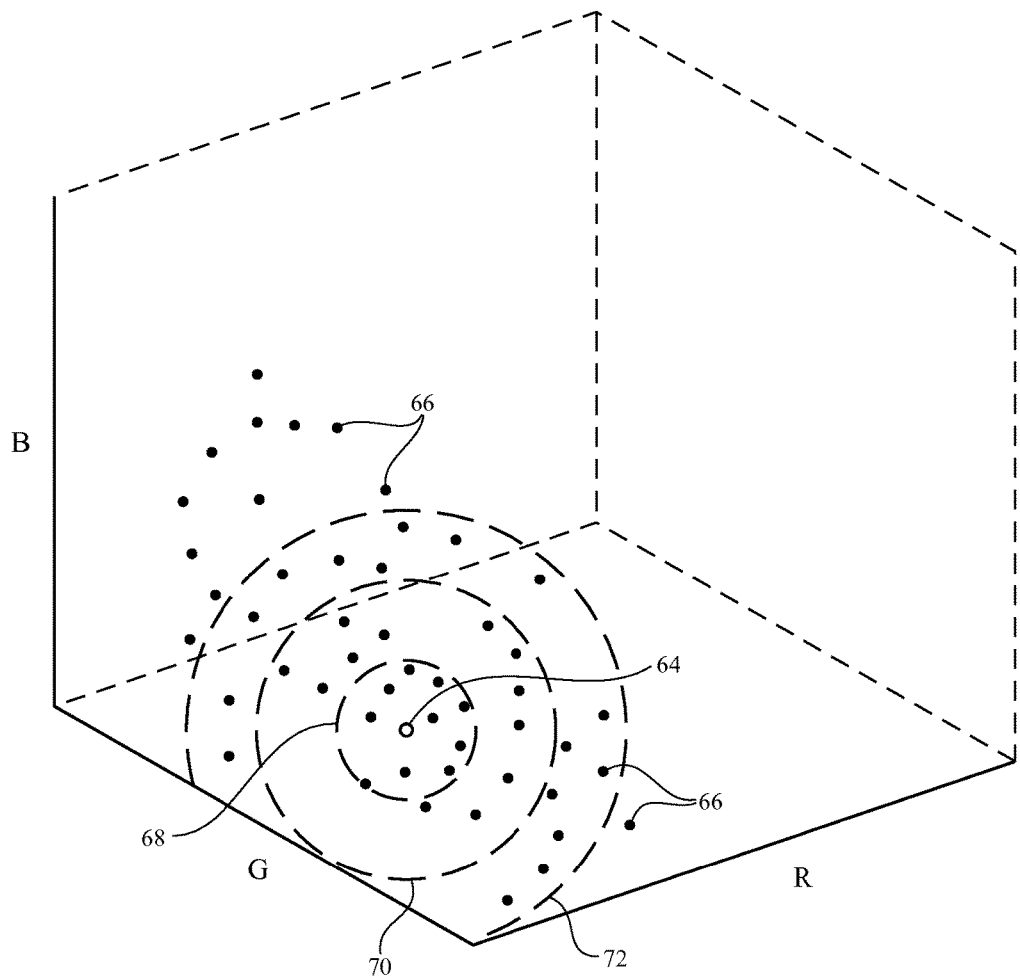
FIG. 6 is a graph showing how training data may be weighted based on a target light source to adaptively determine a color converting matrix during operation of an electronic device in accordance with an embodiment.

FIG. 6 is a diagram showing illustrative training data that may be stored in electronic device 10. The graph of FIG. 6 shows training data such as data points 66 in a three-dimensional color space (e.g., a sensor-dependent RGB color space, as an example). For each data point 66, device 10 may store device-independent color data (e.g., X, Y, and Z tristimulus values, a luminance value Y and chromaticity coordinates x and y, or other suitable device-independent color data) and device-dependent color data (e.g., an RGB value including a red, green, and blue value, an RGBC value including a red, green, blue, and clear value, or other suitable value in sensor-dependent color space). Each data point 66 may correspond to a different light source. For example, each data point 66 may correspond to the RGB response of light sensor 60 for a given light source having XYZ color data. By storing both the RGB response information and the XYZ color information associated with the light source that produces the RGB response, control circuitry 16 may determine a color converting matrix for a given light source using a rearranged version of the equation of FIG. 5 (e.g., by multiplying a matrix containing the XYZ color data with the pseudoinverse of a matrix containing the RGB response information).

When making color measurements with sensor 26 while a user is using device 10, device 10 may use information on which type of ambient light source is present (sometimes referred to as a target light source) to determine which sensor calibration data should be used in processing sensor measurements (e.g., which data points 66 should be used to determine color converting matrix T).

In some scenarios, for example, it may be desirable to target a particular light source or group of light sources rather than weighting all training light sources associated with data points 66 equally. To selectively control the influence of the training light sources in determining the color of a given light source, control circuitry 16 may determine a weighting function that weights the training data based on the distance between the data and a target light source in a given color space.

As shown in FIG. 6, control circuitry 16 may determine a target light source represented by point 64 in a suitable color space (e.g., a device-dependent color space such as a red-green-blue color space). Training data 66 that is further from the target light source data 64 may be weighted less than training data 66 that is closer to the target light source data 64. For example, training data 66 in region 68 may be given the highest weights, training data 66 in region 70 may be given the next highest weights, training data 66 in regions 72 may be given the lowest weights, etc., where regions 68, 70, and 72 are concentric spherical regions centered around target point 64. In this way, control circuitry 16 may determine a color converting matrix T that not only accounts for the spectral response of sensor 26 but also one that can be adjusted to target a particular color or light source in the ambient light.

Figure 7:
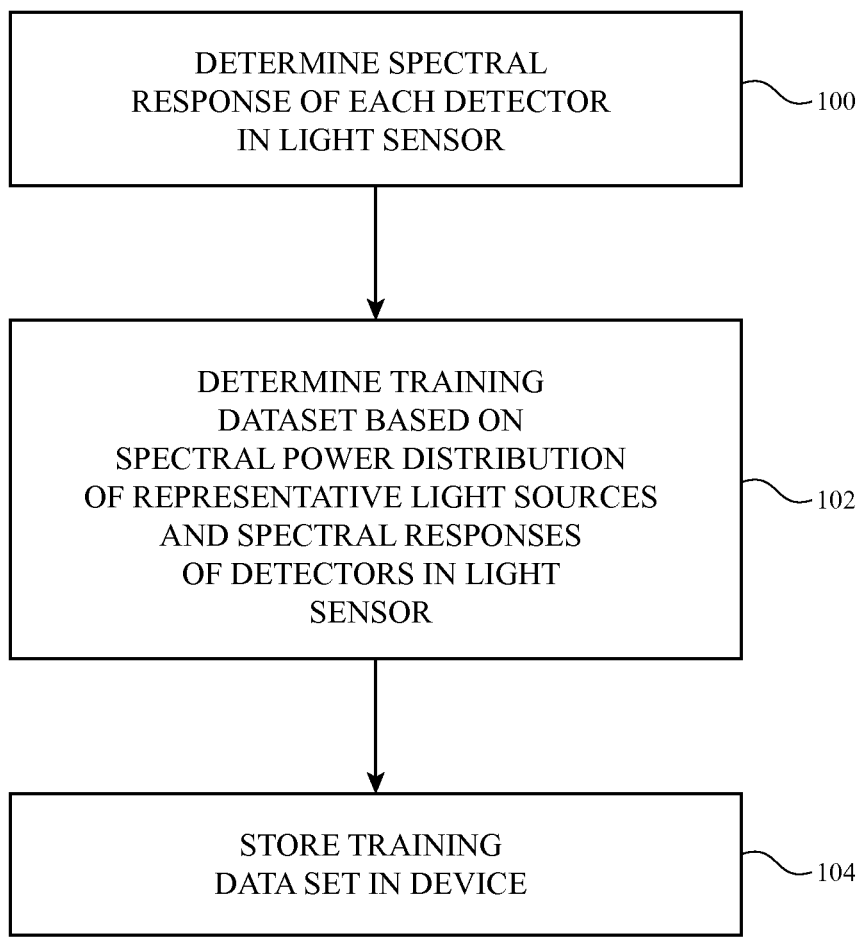
FIG. 7 is a flow chart of illustrative steps involved in providing an electronic device with training data that may be used to adaptively determine a color converting matrix during operation of the electronic device in accordance with an embodiment.

FIG. 7 is a flow chart of illustrative steps involved in providing electronic device 10 with a training dataset that control circuitry 16 may use to adaptively determine a color converting matrix for mapping sensor data to device-independent color data.

At step 100, calibration computing equipment may determine the spectral sensitivity of sensor 26. This may include, for example, gathering sensor data from photodetectors 60 of light sensor 26 while exposing light sensor 26 to different light sources having known spectral power distributions. Step 100 is described in greater detail below in connection with FIG. 8.

At step 102, the calibration computing equipment may determine a training dataset using representative light sources and using the spectral sensitivity of the sensor (determined in step 100). This may include, for example, determining the color of each representative light source in a device-independent color space (e.g., determining the XYZ tristimulus values of each light source) and determining a sensor response for each light source in sensor-dependent color space (e.g., RGBC color space or other suitable color space). Step 102 is described in greater detail below in connection with FIG. 9

At step 104, the training dataset may be stored in device 10 (e.g., using control circuitry 16).

Figure 8:
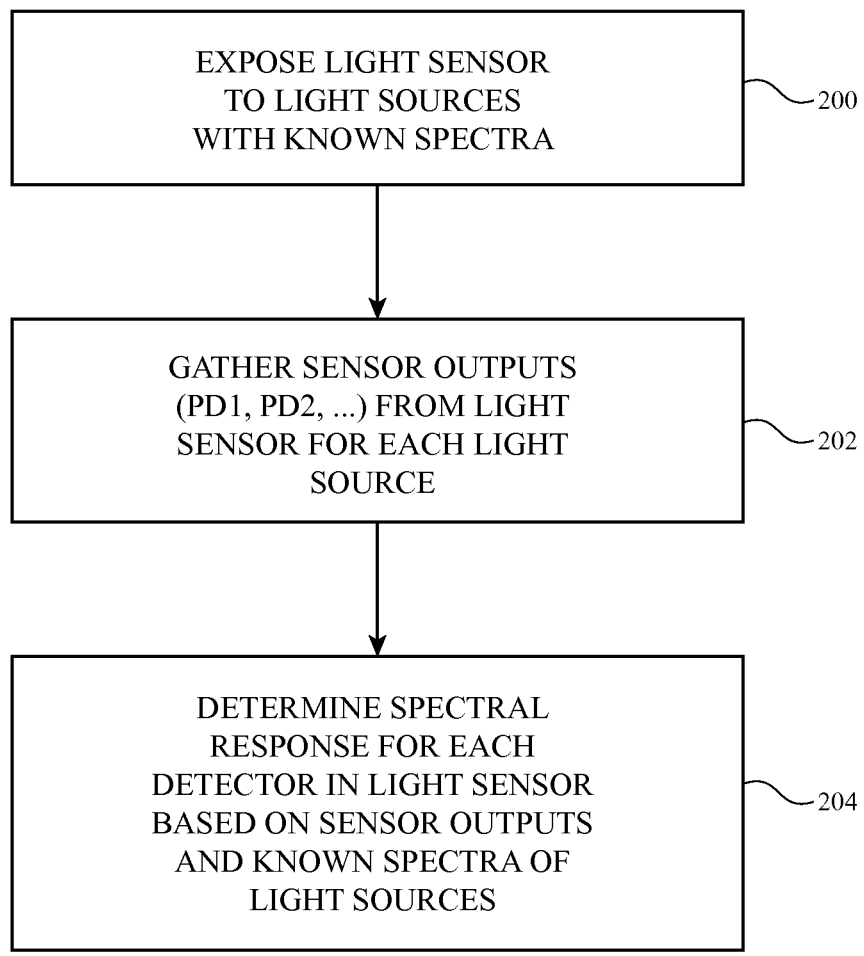
FIG. 8 is a flow chart of illustrative steps involved in determining the spectral response of individual channels in a multichannel ambient light sensor in accordance with an embodiment.

FIG. 8 is a flow chart of illustrative steps involved in performing step 100 of FIG. 7 to determine the spectral response of light sensor 26.

At step 200, calibration computing equipment may expose light sensor 26 to a variety of light sources with known spectra (e.g., with known spectral power distributions). For example, a first light source may have a spectrum $S1(\lambda)$, a second light source may have a spectrum $S2(\lambda)$, etc.

At step 202, the calibration computing equipment may gather sensor outputs from sensor 26 while sensor 26 is exposed to the variety of light sources. For example, a first photodetector 60 may produce a sensor output $PD1_{L1}$ for a first light source, $PD1_{L2}$ for a second light source, etc. If light source 26 is exposed to m light sources, calibration computing equipment may gather m sensor outputs from each detector 60 in light sensor 26. The sensor outputs may be values associated with a sensor-dependent color space. For example, detector outputs may be red, green, and blue (RGB) values in a red-green-blue color space, may be red, green, blue, and clear/white values in a red-green-blue-clear or red-green-blue-white color space, or may be values in another suitable device-dependent color space.

At step 204, the calibration computing equipment may determine the spectral response of each detector 60 in light sensor 26 using the known spectral power distributions of the light sources and the sensor output value for each light source. Assuming that the sensor output values are equal to the product of the spectral power distribution of a light source and the spectral sensitivity of the light sensor, calibration computing equipment may use an optimization technique or an inverse matrix technique to recover the spectral sensitivity of the light sensor.

Figure 9:
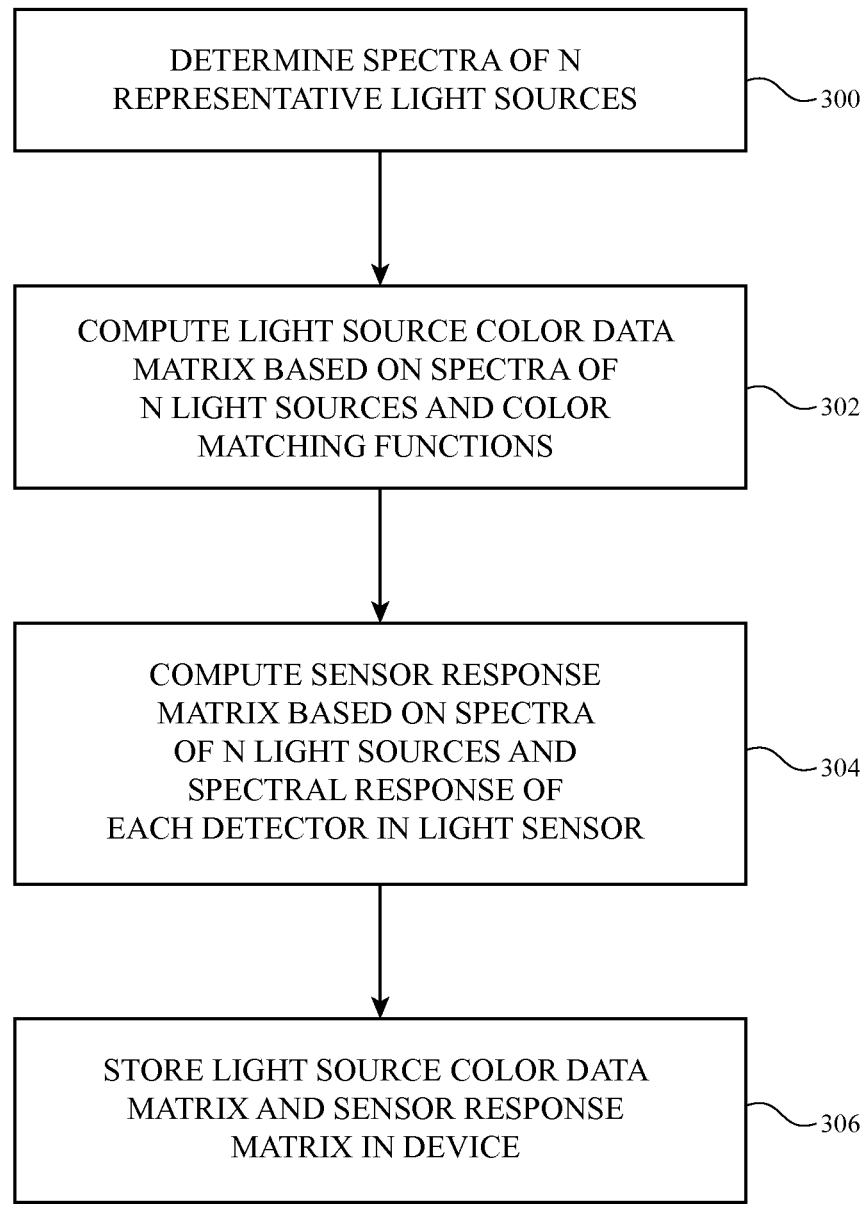
FIG. 9 is a flow chart of illustrative steps involved in determining training data based on the spectra of various representative light sources in accordance with an embodiment.

FIG. 9 is a flow chart of illustrative steps involved in performing step 102 of FIG. 7 to determine a training dataset for light sensor 26.

At step 300, calibration computing equipment may determine the spectra of various training light sources (e.g., n light sources). This may include, for example, using a reference spectroradiometer, spectroscope, or spectrometer to make color measurements on the selected light sources. For example, the spectroradiometer may measure the spectral power distribution of each light source. If desired, the training light sources used may be selected to avoid having light sources with very similar spectral power distributions. This is, however, merely illustrative. If desired, light sources with similar spectral power distributions may be used.

If desired, training light sources with known spectral power distributions may be used and the measurement step (step 300) may be omitted.

At step 302, the calibration computing equipment may compute a light source color data matrix A for each light source based on the spectral power distribution of the light source (determined in step 300) and color matching functions (e.g., the CIE color matching functions $\bar{x}$, $\bar{y}$, and $\bar{z}$. The color data in the color data matrix may be computed by multiplying the spectral power distribution of each light source (determined in step 300) with the color matching functions $\bar{x}$, $\bar{y}$, and $\bar{z}$ to obtain tristimulus values X, Y, and Z. Each column of the light source color data matrix A may contain the XYZ tristimulus values for a given training light source. For example, a first column of matrix A may include the XYZ tristimulus values associated with a first training light source, a second column may include the XYZ tristimulus values associated with a second training light source, etc.

At step 304, the calibration computing equipment may compute a sensor response matrix S based on the spectra of the n light sources. The sensor response information in the sensor response matrix may be computed by multiplying the spectral power distribution of each light source (determined in step 300) with the spectral response of each light detector (determined using the process of FIG. 8). Each column of the sensor response matrix S may include a sensor output value for each photodetector 60 in ambient light sensor 26. For example, a first column may include values PD11, PD21, PD31, etc., indicating each photodetector response for a first training light source, a second column may include values PD12, PD22, PD32, etc., indicating each photodetector response for a second light source, etc.

At step 306, the calibration computing equipment may store the light source color value matrix A and the light sensor response matrix S in device 10. This may include, for example, storing a calibration file having the following columns, with each row representing data for a different training light source: luminance of training light source, chromaticity coordinates of training light source, sensor output for PD1 (e.g., red channel), PD2 (e.g., blue channel), PD3 (e.g., green channel), PD4 (e.g., clear or white channel).

Figure 10:
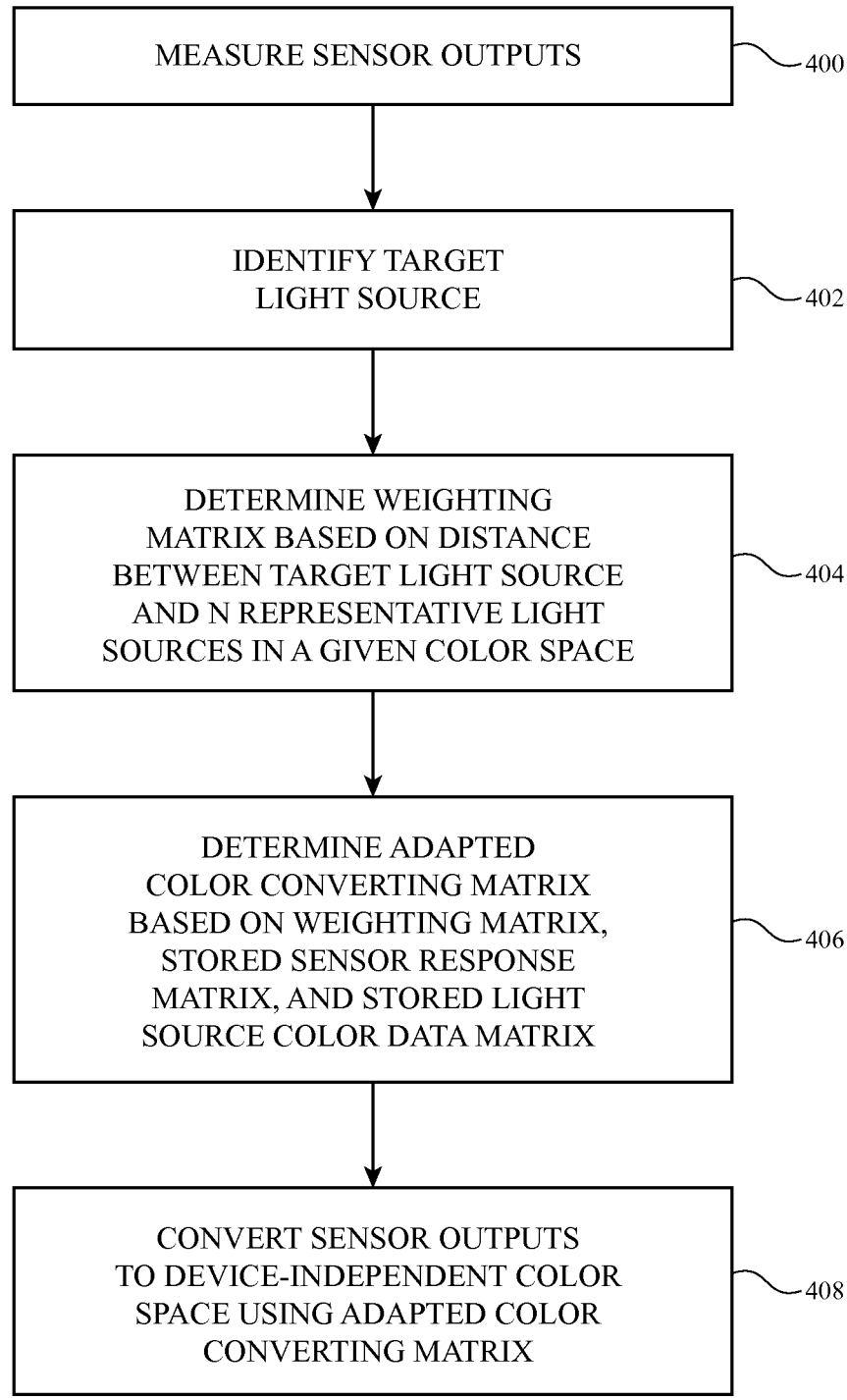
FIG. 10 is a flow chart of illustrative steps involved in making color measurements with a color sensing ambient light sensor during operation of an electronic device using an adaptive color converting matrix in accordance with an embodiment.

A device having a sensor that has been calibrated using this type of calibration scheme may be operated in accordance with the flow chart of FIG. 10.

At step 400, device 10 may be exposed to ambient light having a given spectrum. When exposed to the input light, sensor 26 will produce an output that can be gathered by device 10 and stored (e.g., using control circuitry 16).

After gathering the detector output signals from sensor 26 at step 400, device 10 may, at step 402, identify which type of light source is currently being used to illuminate device 10. For example, if IR detector PD7 detects that more than a predetermined amount of infrared light is present relative to the total ambient light reading, the current lighting conditions can be characterized as falling within the IR lighting type. If there is no IR light present (i.e., if the IR signal is less than a predetermined amount relative to the other types of light), the lighting source can be characterized as being one of the non-IR types.

After gathering sensor readings from sensor 26 and identifying a target light source, control circuitry 16 may determine an appropriate weighting matrix to apply to the training data based on the target light source. The waiting matrix may, for example, be a matrix having n weighting values on the diagonal and zeroes elsewhere. The weighting function W may be calculated as follows:

$$W = \begin{bmatrix} w_1 & 0 & \cdots & 0 \\ 0 & w_2 & \cdots & 0 \\ \vdots & \vdots & \ddots & 0 \\ 0 & 0 & \cdots & w_n \end{bmatrix} \quad (1)$$

$$w_i = 1 / \left( \sqrt{(R_t - R_i)^2 + (G_t - G_i)^2 + (B_t - B_i)^2 + (C_t - C_i)^2} + c \right) \quad (2)$$

where c is a small constant (e.g., 0.001), $R_t$, $G_t$, $B_t$, $C_t$ represent the target light source data in sensor space (e.g., data point 64 of FIG. 6), and $R_i$, $G_i$, $B_i$, and $C_i$, represent the $i^{th}$ training light source (e.g., one of data points 66 of FIG. 6). Using the weighted version of the ordinary least squares approach allows control circuitry 16 to vary the influence of training data on formation of the transformation matrix T. As equation (2) shows, a larger distance between a given target light source and a light source in the training dataset leads to a decreased weight in matrix W, thereby reducing the influence that the training light source has on the construction of the transformation matrix T.

The method described above in which the weighting values in the weighting matrix W are determined based on Euclidean distances between each of the training light sources and a target light source in a given color space is merely illustrative. If desired, other metrics such as angular distance (e.g., cosine distance) may be used to determine the weighting values $w_i$ of matrix W. Using the angular distance metric, weighting values $w_i$ may be determined using the following equation:

$$w_i = 1/(d^p + \varepsilon) \quad (3)$$

where p=1, 2, 3, . . . ; where d is the cosine distance between a first vector representing the target light source (e.g., data point 64 of FIG. 6) and a second vector representing the $i^{th}$ training light source (e.g., one of data points 66 of FIG. 6); and where $\varepsilon$ is an arbitrarily small positive quantity. In general, any suitable metric that can be used to compute the pairwise distance between pairs of vectors may be used for determining the distance between the target light source and each training light source in a given color space. Euclidean distance and cosine distance metrics are merely illustrative examples.

At step 406, control circuitry 16 may determine an adapted color converting matrix T based on the weighting matrix W (step 404), the stored sensor response matrix S (step 304 of FIG. 9), and the light source color value matrix A (step 302 of FIG. 9) using the following equation:

$$T = A \times W \times S^T \times (S \times W \times S^T)^{-1} \qquad (4)$$

At step 408, the color of the measured ambient light in device-independent color space (e.g., the XYZ tristimulus values of the measured ambient light) can be determined by multiplying the measured sensor output by the adapted color converting matrix T. If desired, ambient light sensor color information from sensor 26 may be gathered or converted to produce color temperature data, correlated color temperature data, color coordinates, or other color information in addition to or instead of tristimulus values. The use of sensor 26 to make color measurements that are stored as color coordinates is merely illustrative. Any color ambient light information (and intensity information) may be gathered and used by device 10, if desired.

Device 10 may use control circuitry 16 to take suitable action based on the measured color of the ambient light (and, if desired, based on light intensity). For example, device 10 may adjust the color of the images being displayed on display 14, may make other adjustments to display 14, etc.

The foregoing is merely illustrative and various modifications can be made by those skilled in the art without departing from the scope and spirit of the described embodiments. The foregoing embodiments may be implemented individually or in any combination.

What is claimed is:

1. An electronic device that is exposed to ambient light that has an ambient light color, comprising:
a color sensing ambient light sensor that detects the ambient light and that produces a corresponding sensor output signal; and
control circuitry that determines a target color based on the sensor output signal and that adaptively determines a color converting matrix based on the detected ambient light, wherein the control circuitry stores data corresponding to a plurality of different light sources, wherein the control circuitry computes each value in the color converting matrix during operation of the electronic device based on a distance between each light source and the target color in a given color space, wherein the control circuitry converts the sensor output signal from a sensor signal in a device-dependent color space to a sensor signal in a device-independent color space using the color converting matrix to obtain an ambient light color value indicative of the ambient light color, wherein the device-dependent color space is defined by red, green, and blue values, and wherein the device-independent color space is defined by tristimulus values.

2. The electronic device defined in claim 1 wherein the color sensing ambient light sensor has at least six light detectors each having a respective spectral sensitivity profile.

3. The electronic device defined in claim 1 further comprising a display that displays images for a user, wherein the control circuitry adjusts the display at least partly based on the ambient light color value.

4. The electronic device defined in claim 1 wherein the control circuitry weights the data based on the target color.

5. The electronic device defined in claim 1 wherein the control circuitry weights the data by determining a weighting value for each light source based on how close the light source is to the target color, and wherein the color converting matrix is determined based on the weighting values.

6. The electronic device defined in claim 1 wherein the light sensor includes a red channel, a green channel, a blue channel, and a clear channel.

7. The electronic device defined in claim 1 wherein the color sensing ambient light sensor has a semiconductor substrate and has at least five light detectors in the semiconductor substrate each having a respective spectral sensitivity profile.

8. The electronic device defined in claim 7 further comprising an infrared light sensor in the semiconductor substrate.

9. A method for operating an electronic device having a color sensing ambient light sensor and control circuitry, comprising:
with the color sensing ambient light sensor, producing a sensor output signal in response to receiving ambient light; and
with the control circuitry, determining a target color based on the sensor output signal, computing a color converting matrix based on the target color, and converting the sensor output signal from a sensor signal in a first color space to a sensor signal in a second color space using the color converting matrix, wherein computing the color converting matrix comprises computing each value in the color converting matrix during operation of the electronic device based on a distance between a plurality of light sources and the target color in the first or second color space, and wherein converting the sensor output signal comprises multiplying the sensor output signal with the color converting matrix.

10. The method defined in claim 9 wherein converting the sensor output signal from the first color space to the second color space comprises converting the sensor output signal from a device-dependent color space to a device-independent color space.

11. The method defined in claim 9 wherein the control circuitry stores training data comprising a plurality of color values, each color value corresponding to an associated one of the light sources, the method further comprising:
determining a difference between the target color and each of the color values.

12. The method defined in claim 11 further comprising:
determining a weighting value for each stored color value based on the difference between the target color and that stored color value.

13. The method defined in claim 12 wherein computing the color converting matrix comprises computing the color converting matrix based on the weighting values.

14. A method for calibrating a color sensing ambient light sensor in an electronic device, wherein the electronic device comprises control circuitry and wherein the color sensing ambient light sensor comprises a plurality of photodetectors with different spectral responses, the method comprising:
gathering spectral response data from the color sensing ambient light sensor;
gathering spectral power distribution data for a plurality of light sources;
processing the gathered spectral response data and the gathered spectral power distribution data to produce a first set of data corresponding to sensor output values for each of the light sources in a first color space and a second set of data corresponding to color values for each of the light sources in a second color space, wherein the first color space is a device-dependent color space defined at least in part by red values, green values, and blue values, and wherein the second color space is a device-independent color space defined at least in part by chromaticity coordinates; and storing the first and second sets of data in the electronic device, wherein the control circuitry is configured to determine a target color based on an output signal from the color sensing ambient light sensor, compute each value of a color converting matrix during operation of the electronic device based on a distance between the target color and each of the color values in the first or second color space, and apply the color converting matrix to the output signal from the color sensing ambient light sensor.

15. The method defined in claim 14 wherein processing the gathered spectral response data and the gathered spectral power distribution data comprises multiplying the spectral power distribution data by the spectral response data to obtain the first set of data.

16. The method defined in claim 15 wherein processing the gathered spectral response data and the gathered spectral power distribution data comprises multiplying the spectral power distribution data by a set of color matching functions to obtain the second set of data.

* * * * *